United States Patent [19]

Naito

[11] Patent Number: 4,776,424
[45] Date of Patent: Oct. 11, 1988

[54] DRIVING FORCE DISTRIBUTION CONTROL SYSTEM FOR 4WD VEHICLE

[75] Inventor: Genpei Naito, Yokosuka, Japan

[73] Assignee: Nissan Motor Co., Ltd., Yokohama, Japan

[21] Appl. No.: 893,245

[22] Filed: Aug. 5, 1986

[30] Foreign Application Priority Data

Aug. 5, 1985 [JP] Japan ............................. 60-172934

[51] Int. Cl.⁴ .......................................... B60K 17/34
[52] U.S. Cl. ....................................... 180/233; 74/866;
180/197; 180/247; 364/424.1
[58] Field of Search .............. 180/233, 197, 247, 248, 180/79; 364/424.1, 426, 424; 74/866; 192/0.052, 0.075, 0.076

[56] References Cited

U.S. PATENT DOCUMENTS

| | | | |
|---|---|---|---|
| 4,466,502 | 8/1984 | Sakai | 180/247 |
| 4,511,014 | 4/1985 | Makita | 180/197 |
| 4,562,541 | 12/1985 | Sakakiyama | 180/233 X |
| 4,609,064 | 9/1986 | Suzuki et al. | 180/247 |

FOREIGN PATENT DOCUMENTS

| | | |
|---|---|---|
| 182312 | 5/1986 | European Pat. Off. . |
| 3317247 | 11/1984 | Fed. Rep. of Germany . |
| 3434395 | 5/1985 | Fed. Rep. of Germany . |
| 12827 | 1/1983 | Japan ............................. 180/233 |
| 58-26636 | 2/1983 | Japan . |
| 60-143135 | 7/1985 | Japan . |

OTHER PUBLICATIONS

"Motor Trend" (Porsche 959), published Sep. 1985.

Primary Examiner—John J. Love
Assistant Examiner—Mitchell J. Hiu
Attorney, Agent, or Firm—Foley & Lardner, Schwartz, Jeffery, Schwaab, Mack, Blumenthal & Evans

[57] ABSTRACT

A four wheel drive system of a vehicle has a multiple disc friction type transfer clutch capable of varying torque transmitted to front wheels, a hydraulic circuit for varying an engagement force of the transfer clutch by supplying a fluid pressure to the transfer clutch, front and rear wheel rotational speed sensors, a sensor for sensing a turning radius corresponding to a steering angle, and a control unit for varying the torque transmitted to the front wheels by sending a control signal to the hydraulic circuit in accordance with a front and rear wheel speed difference, a vehicle speed and the turning radius.

6 Claims, 7 Drawing Sheets

DRIVING FORCE DISTRIBUTION CONTROL SYSTEM FOR 4WD VEHICLE

BACKGROUND OF THE INVENTION

The present invention relates to a system for controlling the distribution of a driving force or torque between front wheels and rear wheels of a four-wheel drive vehicle.

Japanese patent provisional publication No. 58-26636 shows a conventional example of such a control system. In this system, a control circuit calculates a slip rate between front and rear wheels from front wheel and rear wheel speeds sensed by rotational speed sensors, and fully engages a clutch in a transfer case to distribute a driving torque equally between the front and rear wheels when the slip rate is equal to or greater than a predetermined value. Thus, this system controls the driving torque distribution in accordance with the difference between the front wheel speed and the rear wheel speed. In this system, however, a front and rear wheel speed difference due to skid such as spin (spinout) and drift (drift-out) is not taken into account.

SUMMARY OF THE INVENTION

It is an object of the present invention to provide a four wheel drive system which can prevent spin and drift by controlling the driving force distribution between the front and rear wheels with due regard to the front and rear wheel rotational speed difference attributable to skid such as spin and drift.

According to the present invention, a drive system for a vehicle having a prime mover, a primary driving wheels such as rear wheels and secondary driving wheels such as front wheels, comprises a transfer, four sensing means, actuating means and control means. The transfer transmits a driving torque from the prime mover to the primary wheels and secondary driving wheels. The transfer comprises a transfer clutch for varying a driving force distribution ratio of a driving torque transmitted to the secondary wheels to a driving torque transmitted to the primary wheels. The four sensing means are means for sensing a primary wheel rotational speed of the primary wheels, means for sensing a secondary wheel rotational speed of the secondary wheels, means for sensing a vehicle speed of the vehicle and means for sensing a turning radius corresponding to a steering angle such as a steering wheel angle or a front wheel steer angle of the vehicle. The actuating means actuates the transfer clutch to vary the distribution ratio in response to a control signal. The control means determines a desired secondary wheel driving torque for driving the secondary wheels in accordance with the vehicle speed, the turning radius and a speed difference resulting from subtraction of the secondary wheel speed from the primary wheel speed, and controls an actual secondary wheel driving torque transmitted to the secondary wheels by sending the control signal to the actuating means so that the actual torque is maintained equal to the desired torque.

DETAILED DESCRIPTION OF THE INVENTION

In general, a difference N between a front wheel rotational speed $N_f$ and a rear wheel rotational speed $N_r$ is expressed as:

$$\begin{aligned} N &= N_r - N_f \\ &= f_1(R \cdot V) + f_2(W)(Q,\mu) \\ &= f_1(R,V) + f_3(Q,\mu) \end{aligned} \quad (1)$$

where R is a turning arc radius, V is a vehicle speed, Q is a driving force (torque), $\mu$ is a coefficient of dynamical (kinetic) friction between tire and road surface, and W is a wheel load. The speed difference N is composed of two functional terms, i.e. $f_1(R,V)$ and $f_3(Q.\mu)$. The first term $f_1(R,V)$ necessarily appears in a steady state turning motion of the vehicle. The other term $f_3(Q,\mu)$ is produced by a skid of the vehicle such as spin or spin-out (in which the rear wheels slide outwardly so that the turning arc is decreased rapidly), and drift or drift-out (in which the front wheels slides outwardly so that the turning arc is increased rapidly). It is not possible to provide an adequate and accurate driving torque distribution control without controlling the term $f_3(Q,\mu)$. According to the present invention, the term $f_3(Q,\mu)$ is taken into account in the following manner.

Figure 5:
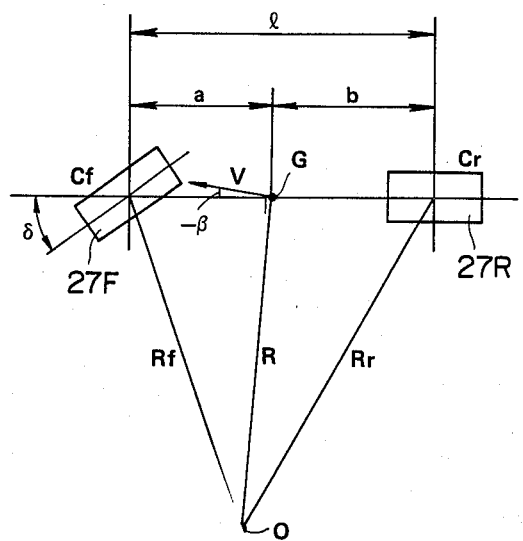
FIG. 5 is a schematic view of front and rear wheels for showing turning radii used in the present invention.

A turning radius difference $\Delta R$ between a turning arc radius $R_f$ of a front wheel 27F shown in FIG. 5 and a turning arc radius $R_r$ of a rear wheel 27R shown in FIG. 5 is expressed as:

$$\begin{aligned} \Delta R &= R_r - R_f \\ &= \frac{l}{R}\left(\frac{mV^2 a}{C_r l} - \frac{l}{2}\right) \end{aligned} \quad (2)$$

Therefore, the rotational speed difference N between the front and rear wheel rotational speeds $N_f$ and $N_r$ is approximately given by:

$$N = N_r - N_f = C(V) \cdot \frac{1}{R^2} \quad (3)$$

where $$C(V) = \frac{Vl}{r}\left(\frac{mV^2 a}{C_r l} - \frac{l}{2}\right)$$

In this example, a tire diameter of the front wheel and a tire diameter of the rear wheel are equal to each other, and expressed as r. In the equations (2) and (3) and in FIG. 5, $C_f$ is a front wheel cornering power, $C_r$ is a rear wheel cornering power, V is the vehicle speed, δ is a front wheel steer angle, G denotes a center of gravity of the vehicle, O denotes a center of a turn, R is a turning arc radius of the center of gravity, λ is a distance between a front axle and a rear axle, a is a distance between the front axle and the center of gravity G, b is a distance between the rear axle and the center of gravity G, m is a vehicle mass, and $-\beta$ is a sideslip angle of the center of gravity G.

From the equation (3), the front and rear wheel speed difference N is approximately expressed as a function of the vehicle speed V and the turning radius R at the center of gravity G:

$$N = f(V,R) \quad (4)$$

Figure 6:
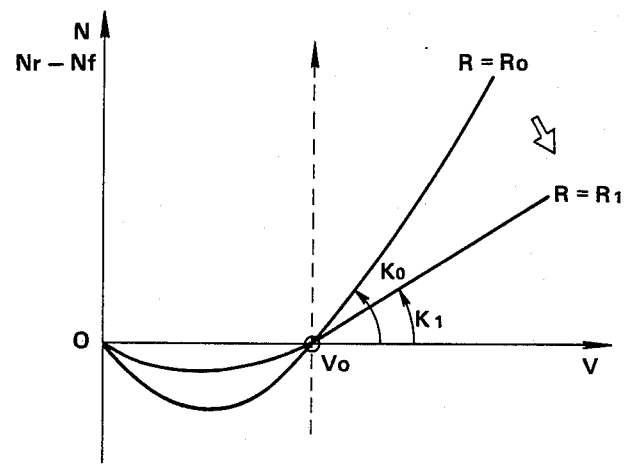
FIG. 6 is a graph showing the difference N between the front and rear wheel speeds as a function of vehicle speed and turning radius.

FIG. 6 is a diagram showing characteristic curves obtained from the equation (4). As shown in FIG. 6, the speed difference N decreases as the turning radius increases from $R_0$ to $R_1$. That is, from the equation (3):

$$N_{R=R_0} = C(V)\frac{1}{R_0^2} \quad (5)$$

$$N_{R=R_1} = C(V)\frac{1}{R_1^2} \quad (6)$$

An increase ΔN of the front and rear wheel speed difference N corresponding to a unit increase ΔV of the vehicle speed V is given by:

$$\Delta N = K \Delta V \quad (7)$$

where K is a rate of increase.
From the equations (5) and (6):

$$K_{R=R_0} = \frac{\Delta N_0}{\Delta V} = \frac{C}{R_0^2} \quad (8)$$

$$K_{R=R_1} = \frac{\Delta N_1}{\Delta V} = \frac{C}{R_1^2}$$

Therefore:

$$\frac{K_{R=R_1}}{K_{R=R_0}} = \left(\frac{R_0}{R_1}\right)^2 \quad (9)$$

Figure 7:
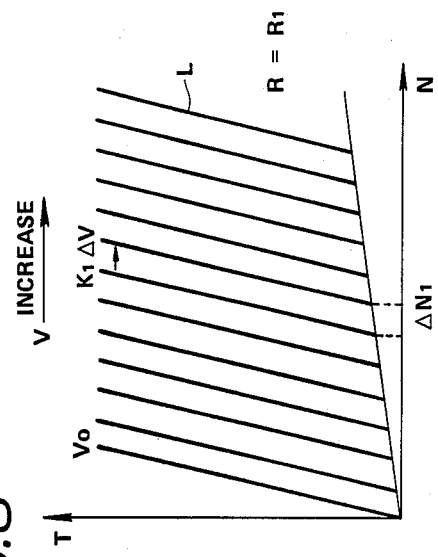
FIG. 7 is a graph showing the torque T versus wheel speed difference N for different turning radii.
Figure 8:
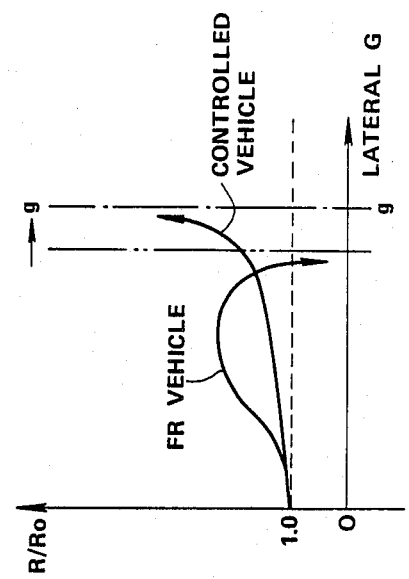
FIG. 8 is a second graph showing the torque T versus wheel speed difference N for different turning radii.

On the assumption that spin and drift appear in a range in which the vehicle speed is equal to or higher than a vehicle speed value $V_0$ shown in FIG. 6, the control is directed to this range. FIGS. 7 and 8 show characteristics between a torque T transmitted to the front wheels and the front and rear wheel speed difference N. As shown in FIGS. 7 and 8, when the vehicle speed V is increased, a line L for setting allowable values is shifted in a direction of increase in the speed difference, by an amount which is equal to a product obtained by multiplying the increase of the vehicle speed ΔV by K. In this way, the front and rear wheel speed difference necessarily appearing in the steady state turning motion is allowed. In this case, the rate of increase K is varied according to the equation (9). If $R_0$ is smaller than $R_1$, then $\Delta N_0$ is greater than $\Delta N_1$ The first term $f_1(R,V)$ of the equation (1) can be regarded as being approximately equal to N given by the equation (4) since the first term is produced by the difference in rolling speed between the front and rear wheels 27F and 27R. The second term $f_3(Q,\mu)$ is produced by reason of the magnitude of the driving force and the coefficient μ of dynamical friction between tire and road surface, and varied by the driving force distribution between the front and rear wheels 27F and 27R. At present, it is not feasible to detect the term $f_3(Q,\mu)$.

Figure 9:
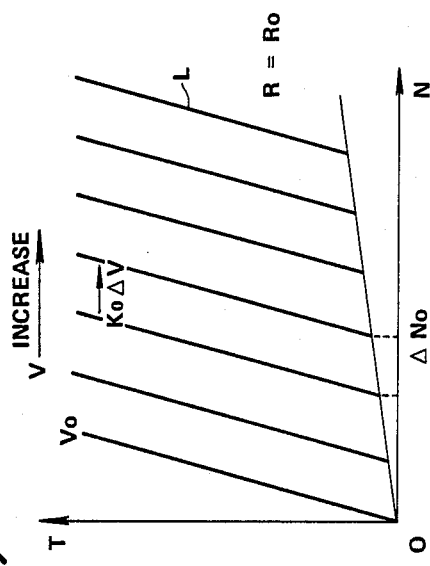
FIG. 9 is a graph showing the characteristic curves for an FR vehicle for speed difference N versus vehicle speed.
Figure 10:
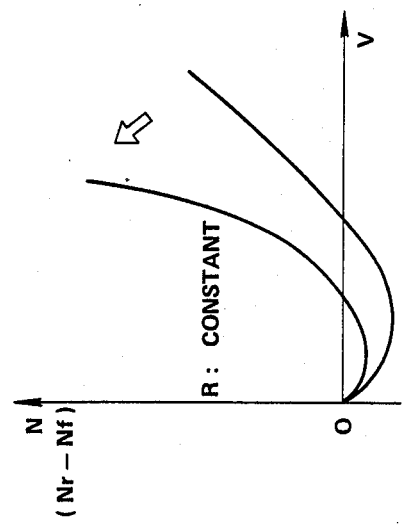
FIG. 10 is a graph showing the characteristic curves for an FR vehicle for lateral acceleration versus tuning radius.

When the front and rear wheel speed difference is produced according to the first term of the equation (1), it is possible to judge that the vehicle is in a steady state motion in which skid such as spin and drift does not exist. If the vehicle is accelerated by increasing the driving force from the steady state motion, then the front and rear wheel speed difference is produced because of slip, and spin or drift-out is produced before a limit value of the coefficient of dynamical friction is reached. As shown by characteristic curves of the front and rear wheel speed difference of a FR vehicle in FIG. 9, when the limit value of the coefficient of dynamical friction μ is low as in a road covered with snow, or the rear wheel driving force is increased, the front and rear wheel speed difference N increases. In FIG. 10 showing characteristics of a lateral acceleration during circular motion, it is clear that the limit value g of a lateral acceleration is higher in the controlled vehicle than in a FR (front engine rear wheel drive) vehicle. In FIG. 10, $R_0$ is a reference turning radius.

Figure 11:
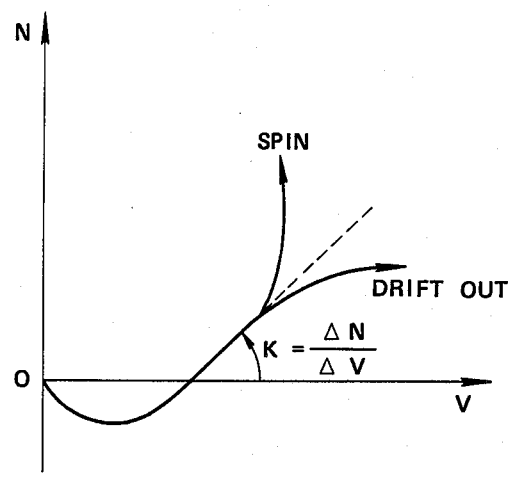
FIG. 11 is a graph showing the spin out and drift out characteristics of an FR vehicle in terms of vehicle speed versus wheel speed difference N.
Figure 12:
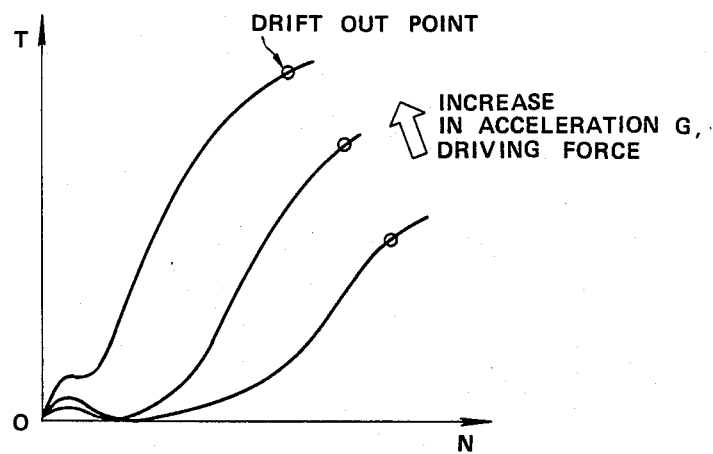
FIG. 12 is a graph showing a relationship between a front wheel driving torque and a front and rear wheel speed difference, obtained by the system of the embodiment of the present invention.

As mentioned before, it is possible to estimate the behavior of the vehicle by monitoring the front and rear wheel speed difference N. In the four wheel drive vehicle based on the FR vehicle, for example, it is possible to judge that the tendency toward drift-out is strong when $K = \Delta N / \Delta V$ is small, and the tendency toward spin is strong when K is large, as shown in FIG. 11. It is desirable to increase the torque transmitted to the front wheels and increase the distribution ratio D of the driving force transmitted to the front wheels to the driving force transmitted to all the wheels by increasing the clutch engagement force (clutch pressure P) when the tendency to spin is high, and to decrease the torque transmitted to the front wheels and decrease the distribution ratio D by decreasing the clutch pressure P when the tendency toward drift is high. In this way, an understeer characteristic can be obtained when the front wheel driving force is increased and the distribution ratio D is increased, and an oversteer characteristic can be obtained when the rear wheel driving force is increased and the ratio D is decreased. Therefore, by performing such a control, it is possible to attain a control in which a T-N characteristic between the front wheel driving torque T and the speed difference N is automatically changed as shown in FIG. 12. In FIG. 12, the characteristic curve moves in a direction shown by an arrow as the driving force increases, the limit of the coefficient of friction of the road surface decreases, and the turning radius R increases.

FIGS. 1-4 show a four wheel drive system of one embodiment of the present invention based on the control theory mentioned with reference to FIGS. 5-12. In this embodiment, the present invention is applied to a four wheel drive vehicle based on an FR (front engine rear wheel drive) vehicle.

Figure 1:
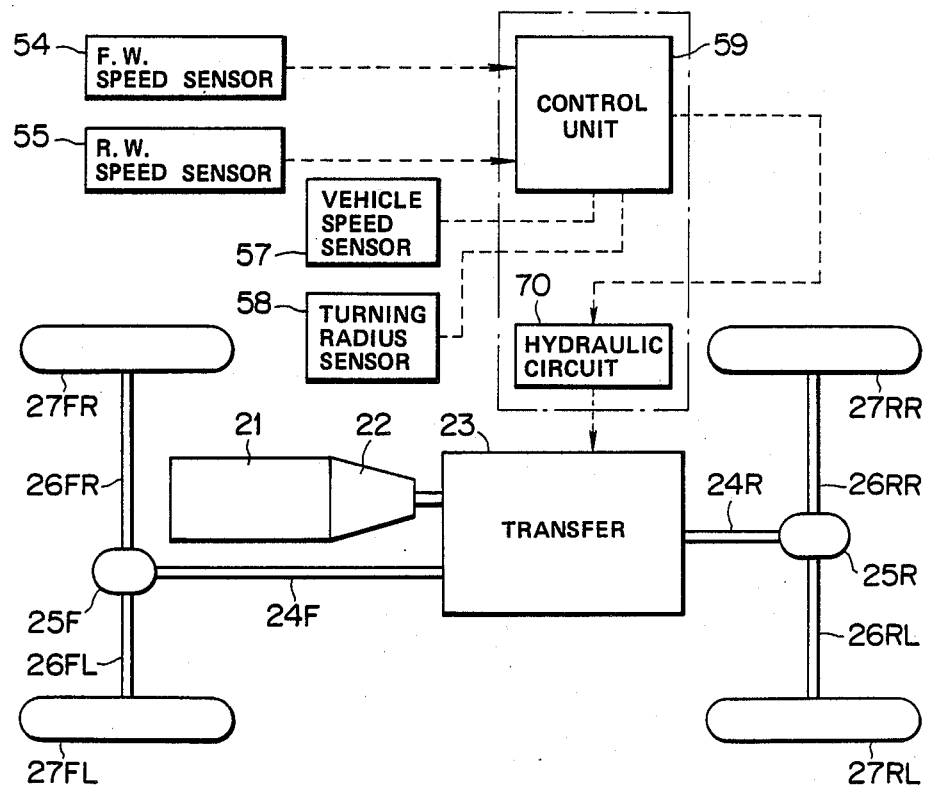
FIG. 1 is a schematic view of a four wheel drive system of one embodiment of the present invention.

As shown in FIG. 1, the vehicle has an engine 21, a transmission 22 united with the engine 21, and a transfer 23 serving as a means for distributing a driving force at a variable distribution ratio. An output shaft of the transmission 22 is connected to a rear wheel propeller shaft 24R and a front wheel propeller shaft 24F through the transfer 23. The rear wheel propeller shaft 24R is connected to right and left rear wheels 27RR and 27RL through a rear wheel differential 25R and right and left rear axles 26RR and 26RL. The front wheel propeller shaft 24F is connected to right and left front wheels 27FR and 27FL through a front wheel differential 25F and right and left front axles 26FR and 26FL.

Figure 3:
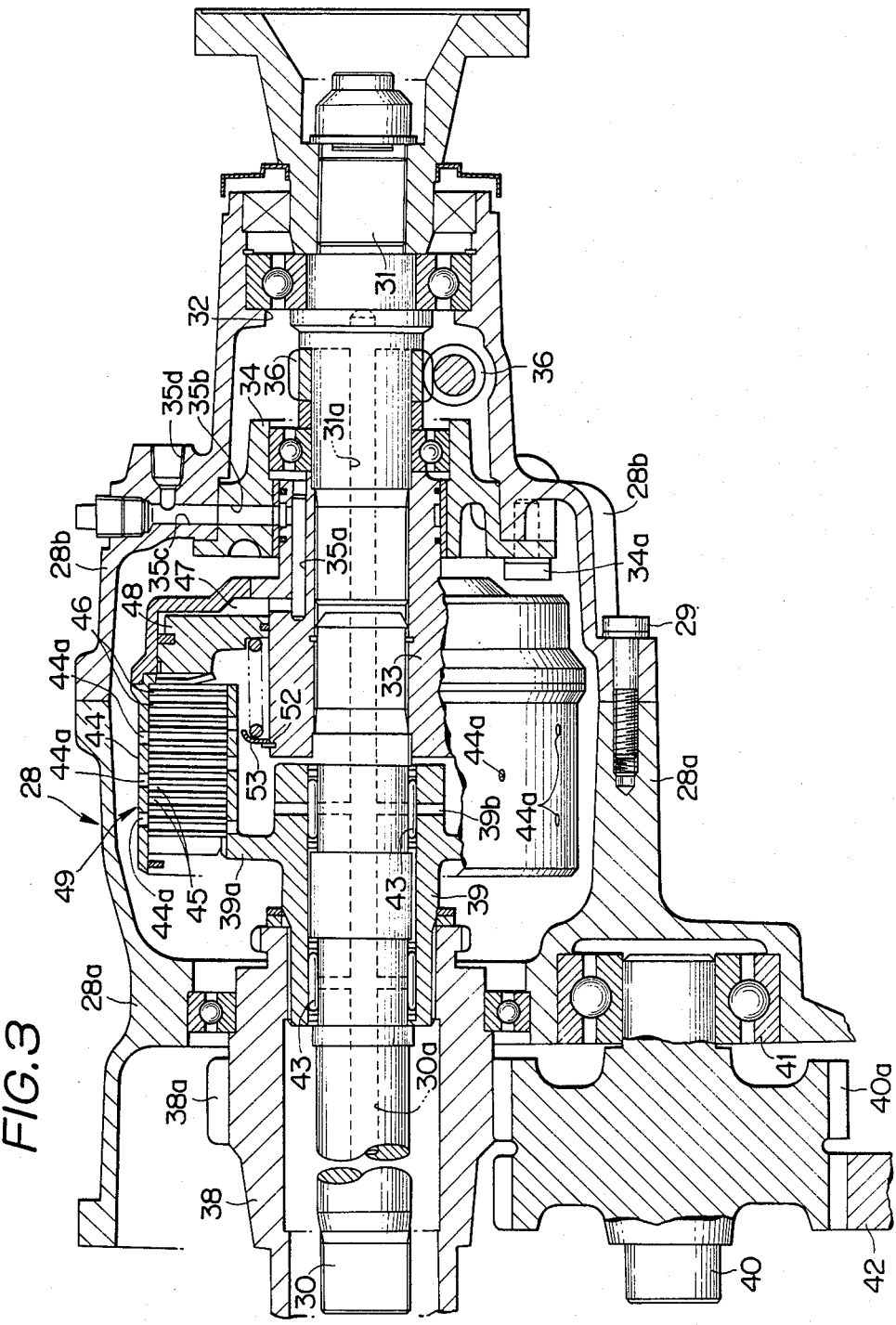
FIG. 3 is a sectional view of a main portion of a transfer shown in FIG. 1.

As shown in FIG. 3, the transfer 23 has a case 28 consisting of two case members 28a and 28b joined together by bolts 29. The case 28 encloses an input shaft 30 connected with the output shaft of the transmission 22, and a rear wheel output shaft 31 which is connected with the rear wheel propeller shaft 24R, and rotatably supported by a bearing 32. Each of the input shaft 30 and the rear wheel output shaft 31 is connected coaxially with a coupling member 33 of a tubular shape by means of splines, so that the input shaft 30 and the rear wheel output shaft 31 rotate together. The coupling member 33 has a drum 44 of a hydraulic type multiple disc friction clutch 49. The drum 44 is provided on the outer periphery of the coupling member 33. The coupling member 33 is rotatably received in a tubular bearing holder 34 which is fixed to the transfer case 28 by bolts 34a.

The input shaft 30 is rotatably received in first and second hollow shafts 38 and 39. As viewed in FIG. 3, the first hollow shaft 38 is placed on the left, and the second hollow shaft 39 is placed on the right. The second hollow shaft 39 is connected with the first shaft 38 by means of splines, and rotatably mounted on the input shaft 30 through needle bearings 43. The first hollow shaft 38 has a drive gear 38a integrally formed on the outer periphery of the first shaft 38. The drive gear 38a is in engagement with a counter gear 40a which is integrally formed in a counter shaft 40. The counter shaft 40 is rotatably supported on the transfer case 28 through a bearing 41. The counter gear 40a is in engagement with a driven gear 42 which is provided in a front wheel output shaft connected to the front wheel propeller shaft 24F. The second hollow shaft 39 is integrally formed wiht a hub 39a projecting radially outwardly. The multiple disc friction clutch 49 is provided between the hub 39a of the second hollow shaft 39 and the drum 44 of the coupling member 33.

The multiple disc friction clutch (transfer clutch) 49 has drive plates 45 and driven plates 46 which are alternately arranged along the axial direction. The drive plates 45 are engaged with the drum 44 by means of splines. The driven plates 46 are engaged with the hub 39a of the second hollow shaft 39 by means of splines. A piston 48 of a ring shape is axially slidable between the drum 44 and the coupling member 33. Both of the outer and inner peripheries of the piston 48 are sealed in a liquid-tight manner to form an oil chamber 47. A spring 53 is disposed under compression between the piston 48 and a reatainer 52 attached to the coupling member 33. The spring 53 pushes the piston 48 toward the oil chamber 47. The oil chamber 47 is in fluid communication with an oil pressure port 35d of the transfer case 28 through a first oil passage 35a formed in the coupling member 33, a second oil passage 35b formed in the bearing holder 34, and a third oil passage 35c formed in the transfer case 28. When a pressurized oil is supplied to the oil chamber 47 through the port 35d and the first, second and third passages 35a, 35b and 35c, the piston 48 moves leftwardly in FIG. 3 against the force of the spring 53, and forces the drive plates 45 and driven plates 46 into frictional contact. In this way, the multiple disc clutch 49 connects the input shaft 30 to the front wheel output shaft by connecting the coupling member 33 to the second hollow shaft 39.

The transfer 23 further has a first lubricating oil passage 30a formed in the input shaft 30, a second lubricating oil passage 31a formed in the rear wheel output shaft 31, a first clutch lubricant passage 39b formed in the second hollow shaft 39, a second clutch lubricant passage 39c formed in the hub 39a of the second hollow shaft 39, and a third clutch lubricant passage 44a formed in the drum 44. A lubricating oil is supplied to the needle bearing 43 and other parts through the first and second lubricating oil passages 30a and 31a. The first, second and third clutch lubricant passages 39b, 39c and 44a convey a lubricating oil to the drive plates 45 and the driven plates 46 of the multiple disc clutch 49. A reference numeral 36 denotes a pinion for speed detection.

Figure 2:
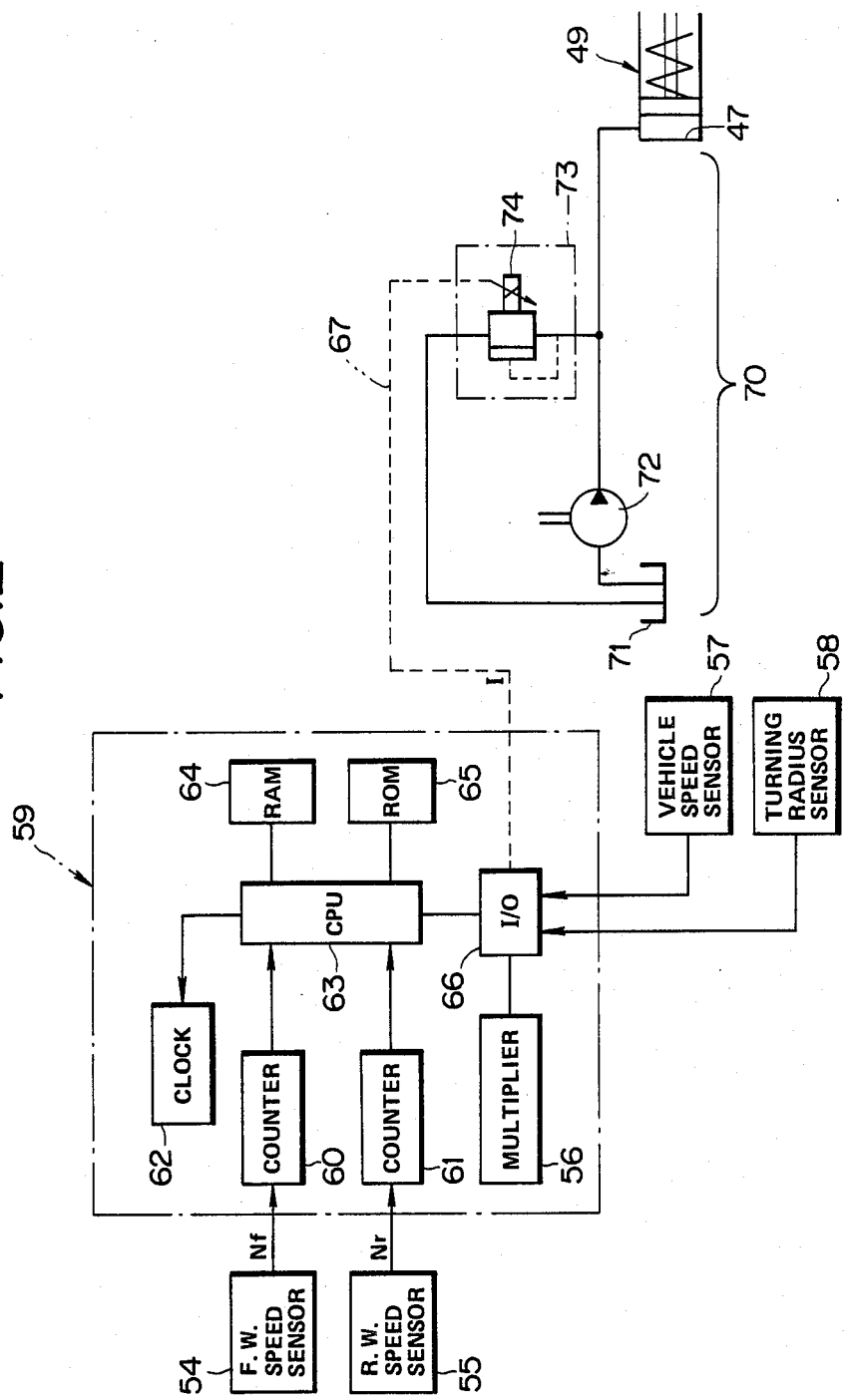
FIG. 2 is a schematic view of a control unit and a hydraulic circuit shown in FIG. 1.

As shown in FIG. 2, the oil chamber 47 of the multiple disc clutch 49 is fluidly connected with a hydraulic circuit 70, which is controlled by a control unit 59. The control unit 59 is connected with a front wheel rotation sensor 54 for sensing a rotational speed of the front wheels 27FR and 27FL, and a rear wheel rotation sensor 55 for sensing a rotational speed of the rear wheels 27RR and 27RL. For example, each of the front wheel rotation sensor 54 and the rear wheel rotation sensor 55 may be of a type having a phototransistor, and disposed near a pinion gear provided in the front wheel output shaft or the rear wheel output shaft 31 of the transfer 23 for producing a pulse signal having a frequency proportional to the rotational speed of the front wheels 27FR and 27FL or the rear wheels 27RR and 27RL. The hydraulic circuit 70 supplies the pressurized oil to the oil chamber 47 of the multiple disc clutch 49, and the control unit 59 controls the oil pressure produced by the hydraulic circuit 70 in accordance with various signals of sensors such as the front and rear wheel rotation sensors 54 and 55. In this embodiment, the control unit 59 is made up of a microcomputer.

The hydraulic circuit 70 includes a pump 72 whose outlet port is connected to the oil chamber 47 of the multiple disc clutch 49 and a reservoir 71, and an electromagnetic valve 73 disposed between the outlet port of the pump 72 and the reservoir 71. The pump 72 is driven by the engine 21, and pressurizes the oil of the reservoir 71. The electromagnetic valve 73 has a solenoid 74 connected with the control unit 59, and a spool which moves in accordance with the output pressure of the pump 72 and an electromagnetic force of the solenoid 74. The electromagnetic valve 73 varies the oil pressure (the clutch pressure) supplied to the oil chamber 47 by connecting the oil chamber 47 to the reservoir 71 through an opening whose opening degree corresponds to the magnitude of a current supplied to the solenoid 74 from the control unit 59 and the output pressure of the pump 72, and maintains the clutch pressure P at a value corresponding to the magnitude of the current supplied to the solenoid 74.

The control unit 59 is further connected with a vehicle speed sensor 57 for sensing the vehicle speed V, and a sensor 58 for sensing a turning radius corresponding to a steering angle such as a steering wheel angle or a front wheel steer angle of the vehicle.

The control unit 59 has a first counter 60 for counting the pulses produced by the front wheel rotation sensor 54, a second counter 61 for counting the pulses produced by the rear wheel rotation sensor 55, a multiplier 56 for performing multiplication by using the rate of increase K determined in accordance with the above-mentioned equation (7), and a central processing unit (CPU) 63. The control unit 59 further has a random-access memory (RAM) 64 serving as a data storage device, and a read-only member (ROM) 65.

Figure 4A:
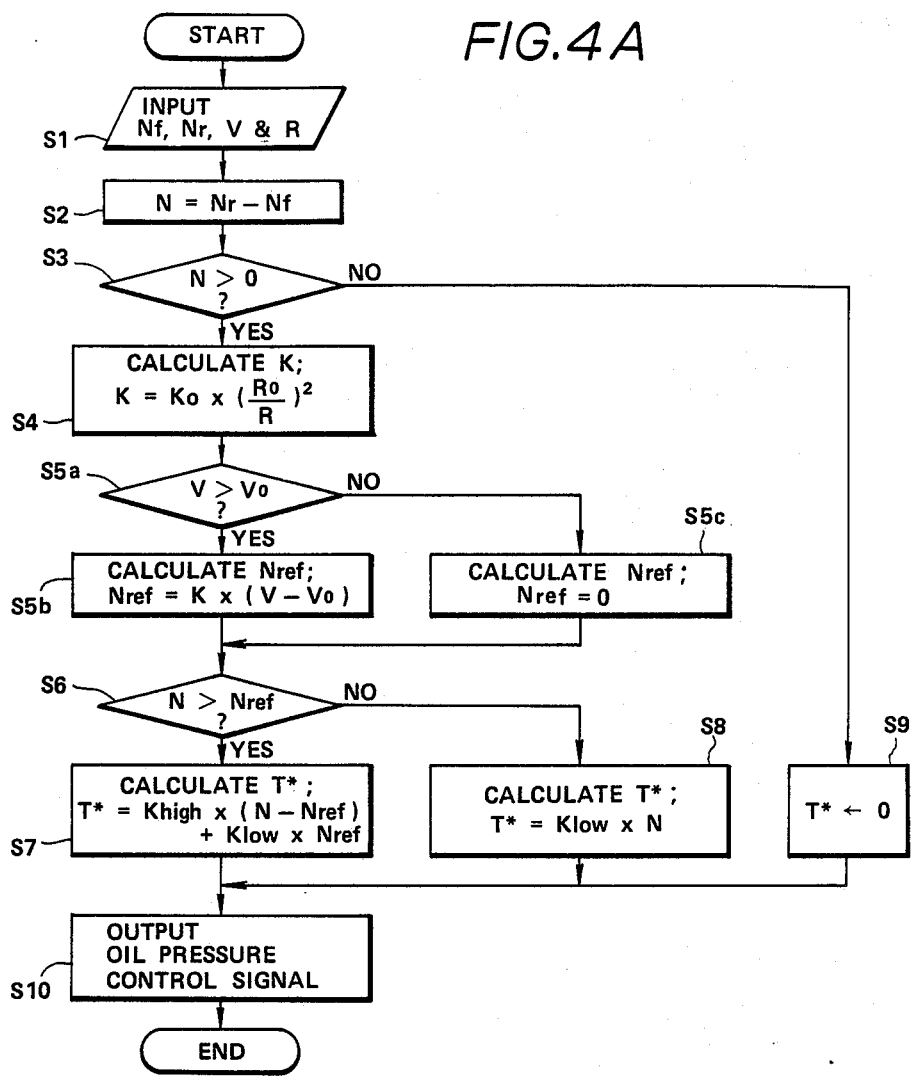
FIG. 4A is a flowchart showing a control of the embodiment of FIG. 1.
Figure 4B:
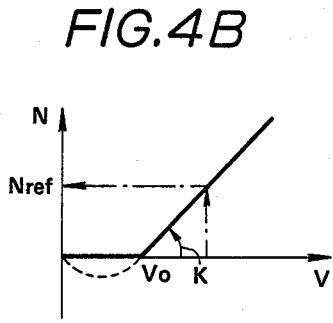
FIGS. 4B and 4C are graphs showing the control of FIG. 4A graphically.
Figure 4C:
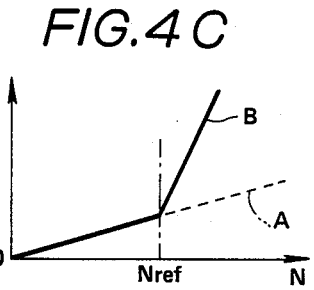

The control unit 59 of this embodiment controls the clutch pressure P in the manner shown in FIG. 4A. At a step S1, the signals representing front and rear wheel rotational speeds $N_f$ and $N_r$ are inputted into the CPU 63 from the front and rear wheel rotation sensors 54 and 55 through the first and second counters 60 and 61, respectively. The output signal of the vehicle speed sensor 57 representing the vehicle speed V and the output signal of the turning radius sensor 58 representing the turning radius R are inputted to the CPU 63 through an input-/output port 66. At a step S2, the CPU 63 determines the speed difference N which is equal to the rear wheel speed $N_r$ minus the front wheel speed $N_f$. At a step S3, the CPU 63 determines whether the speed difference N is greater than zero. If it is not, the CPU 59 sets a desired torque T* for the front wheels equal to zero, at a step S9. If it is, the CPU 63 determines a rate K at a step S4. The rate K is determined in accordance with the equation expressed as:

$$K = K_0 \times \left(\frac{R_0}{R}\right)^2$$

where $K_0$ and $R_0$ are predetermined constants. Then, at a step S5a, the CPU 63 determines whether the vehicle speed V is greater than a predetermined constant $V_0$. If it is, the CPU 63 proceeds to a step S5b. If it is not, the CPU 63 sets a reference speed difference value $N_{ref}$ equal to zero, at a step S5c. At the step S5b, the CPU 63 determines the reference speed difference value $N_{ref}$ in accordance with an equation expressed as: $N_{ref} = K \times (V - V_0)$ where $V_0$ is the predetermined constant. At a next step S6, the CPU 63 determines whether the speed difference N is greater than the reference speed difference value $N_{ref}$. Then, the CPU 63 proceeds to a step S7 if N is greater than $N_{ref}$, and to a step S8 if N is not greater than $N_{ref}$. At the step S8, the CPU 63 determines the desired torque T* in accordance with an equation expressed as: $T^* = K_{low} \times N$ where $K_{low}$ is a predetermined first constant. At the step S7, the CPU 63 determines the desired torque T in accordance with an equation expressed as:

$$T^* = K_{high} \times (N - N_{ref}) + K_{low} \times N_{ref}$$

where $K_{high}$ is a predetermined second constant which is greater than $K_{low}$. At a step S10, the CPU 63 outputs the signal to control the clutch pressure P, corresponding to the desired torque T. determined at the step S7, S8 or S9, to the solenoid 74 of the electromagnetic valve 73 through the input/output port 66 and an output circuit 67. Therefore, the clutch pressure P is controlled in accordance with the current I supplied to the solenoid 74. FIGS. 4B and 4C show the calculation of the step S5, and the calculations of the steps S7 and S8 graphically. In FIG. 4C, a line A corresponds to the equation of the step S8, and a line B corresponds to the equation of the step S7.

It is optional to omit the vehicle speed sensor 57 by using, as the vehicle speed sensor, the front wheel rotation sensor 54 for sensing the speed of the front wheels which are not always driven.

The four wheel driven system of the present invention can prevent skid such as spin and drift by controlling the driving torque distribution between the front and rear wheels adequately in accordance with not only the front and rear wheel speed difference but also the vehicle speed and the turning radius corresponding to the steering angle.

What is claimed is:

1. A drive system for a vehicle having a prime mover, primary driving wheels and secondary driving wheels, comprising:
    a transfer for transmitting a driving torque from said prime mover to said primary driving wheels and secondary driving wheels, said transfer comprising a transfer clutch for varying a driving torque distribution ratio which is a ratio of a driving torque transmitted to said secondary wheels to a driving torque transmitted to said primary wheels,
    means for sensing a primary wheel rotational speed of said primary wheels,
    means for sensing a secondary wheel rotational speed of said secondary wheels,
    means for sensing a vehicle speed of said vehicle,
    means for sensing a turning radius of said vehicle corresponding to a steering angle of said vehicle,
    means for actuating said transfer clutch to vary said distribution ratio in response to a control signal, and
    control means for determining a speed difference between said secondary wheel speed sensed by said secondary wheel speed sensing means and said primary wheel speed sensed by said primary wheel speed sensing means, and determining a secondary wheel driving torque from said speed difference by using a characteristic which causes said desired secondary wheel driving torque to be varied with an increase in said speed difference, and adjusting said characteristic in accordance with said turning radius sensed by said turning radius sensing means and said vehicle speed sensed by said vehicle speed sensing means,
    wherein said control means increases said actual secondary wheel driving torque gradually with an increase in said speed difference when said speed difference is smaller than a reference value which is determined in accordance with said turning radius and said vehicle speed, and increases said actual torque steeply with an increase in said speed difference when said speed difference is greater than said reference value, and wherein said reference value is equal to a product between a result of subtraction of a predetermined speed value from said vehicle speed, and a rate which is inversely proportional to the second power of said turning radius if said vehicle speed is greater than said predetermined speed value, and said reference value is equal to zero if said vehicle speed is smaller than said predetermined speed value.

2. A drive system according to claim 1 wherein said desired secondary wheel driving torque is equal to a product between a first coefficient and said speed difference when said speed difference is smaller than said reference value, and equal to a sum between a first product and a second product when said speed difference is greater than said reference value, said first product being equal to a result obtained by multiplying a difference resulting from subtraction of said reference value from said speed difference by a second coefficient which is greater than said first coefficient, and said second product being equal to a result obtained by multiplying said reference value by said first coefficient.

3. A drive system according to claim 2 wherein said control means reduces said desired torque to zero if said speed difference is equal to or lower than zero.

4. A drive system according to claim 3 wherein said primary wheels are rear wheels, and said secondary wheels are front wheels.

5. A drive system according to claim 4 wherein said transfer clutch is a multiple disc friction clutch operated by a fluid pressure, and said actuating means is a hydraulic circuit for controlling the fluid pressure.

6. A drive system according to claim 5 wherein said transfer comprises an input member for receiving torque from said prime mover, a first output member connected with said input member for driving said primary wheels and a second output member connected with said input member through said transfer clutch for driving said secondary wheels.

* * * * *